(12) United States Patent
Wong et al.

(10) Patent No.: US 8,165,307 B2
(45) Date of Patent: Apr. 24, 2012

(54) AUDIO ELECTRONIC DEVICE

(75) Inventors: Shih-Fang Wong, Taipei Hsien (TW); Tai-Chun Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1095 days.

(21) Appl. No.: 11/957,414

(22) Filed: Dec. 15, 2007

(65) Prior Publication Data

US 2008/0255690 A1 Oct. 16, 2008

(30) Foreign Application Priority Data

Apr. 12, 2007 (CN) .......................... 2007 1 0200453

(51) Int. Cl.
*G06F 17/00* (2006.01)
(52) U.S. Cl. .............. 381/58; 381/59; 381/120; 368/10; 368/12; 73/514.01; 73/514.34; 345/157; 379/433.01; 700/94
(58) Field of Classification Search ...................... 381/58, 381/59, 120; 368/10, 12; 73/514.01, 514.34; 345/157; 379/433.01
See application file for complete search history.

(56) References Cited

U.S. PATENT DOCUMENTS

| | | | | |
|---|---|---|---|---|
| 5,256,960 A * | 10/1993 | Novini | ............................. | 324/72 |
| 5,894,580 A * | 4/1999 | Yoshida | ......................... | 713/340 |
| 6,011,755 A * | 1/2000 | Mulhall et al. | .................. | 368/10 |
| 6,668,566 B2 * | 12/2003 | Brun et al. | ....................... | 62/154 |
| 6,704,428 B1 | 3/2004 | Wurtz | | |
| 6,763,238 B1 * | 7/2004 | Okano | ......................... | 455/456.4 |
| 6,888,779 B2 * | 5/2005 | Mollicone et al. | ............... | 368/10 |
| 6,894,434 B1 * | 5/2005 | Kosoff | ........................... | 315/134 |
| 7,106,662 B1 * | 9/2006 | Acker, Jr. | ........................ | 368/73 |
| 7,260,068 B2 | 8/2007 | Hsieh et al. | | |
| 7,757,555 B2 * | 7/2010 | Pan et al. | .................... | 73/514.24 |
| 7,843,430 B2 * | 11/2010 | Jeng et al. | ...................... | 345/158 |
| 7,976,386 B2 * | 7/2011 | Tran | ................................ | 463/36 |
| 2006/0167623 A1 * | 7/2006 | Alexander | ..................... | 701/207 |
| 2007/0097793 A1 * | 5/2007 | Nguy et al. | ...................... | 368/15 |
| 2007/0217290 A1 * | 9/2007 | Rock | ................................ | 368/12 |
| 2008/0008313 A1 * | 1/2008 | Fyke | ........................ | 379/433.01 |
| 2008/0221446 A1 * | 9/2008 | Washburn et al. | ............ | 600/437 |
| 2008/0236282 A1 * | 10/2008 | Kim et al. | ................... | 73/514.01 |
| 2008/0267015 A1 * | 10/2008 | Zhang et al. | ..................... | 368/10 |
| 2009/0110206 A1 * | 4/2009 | Haggis et al. | ................... | 381/58 |
| 2010/0156783 A1 * | 6/2010 | Bajramovic | .................. | 345/156 |

FOREIGN PATENT DOCUMENTS

| | | | |
|---|---|---|---|
| CN | 1784050 A | | 6/2006 |
| EP | 1662358 A1 | | 5/2006 |
| JP | 2005-346566 A | * | 12/2005 |

* cited by examiner

*Primary Examiner* — A O Williams

(74) *Attorney, Agent, or Firm* — Altis Law Group, Inc.

(57) ABSTRACT

An audio electronic device includes a player, an output device, a detector, and an automatic turn-off module. The player is for reproducing audio data. The output device is for transforming the audio data to audible sound. The detector is for detecting positional shift of the output device. The automatic turn-off module is for turning off the player based on the positional shift. An automatic turn-off method is also disclosed.

8 Claims, 5 Drawing Sheets

232

— value-setting menu —

☑ Automatic turn-off function

| Start time | 30 | minutes |
| Motion monitoring time length | 5 | minutes |
| Displacement value | 3 | centimeters |
| Wait time | 60 | seconds |

OK        Back

FIG. 4

AUDIO ELECTRONIC DEVICE

BACKGROUND

1. Field of the Invention

The present invention generally relates to audio electronic devices and methods for automatically turning off such devices.

2. Description of related art

Audio electronic devices, such as MPEG-1 Audio Layer 3 (MP3) players, radios, and mobile phones, are widely used. People often like to listen to music while driving or before going to sleep, however, it is inconvenient to manually turn off the audio electronic devices, especially if a user of the audio electronic device falls asleep while listening to the audio electronic devices. Turn-off time may be set in the audio electronic device to automatically turn off. If an event is triggered, the turn-off operation will be terminated immediately. However, it is difficult for users to accurately set the turn-off time so that the electronic device will turn-off when the users fall asleep. If the turn-off time is set too long, then the audio electronic device may still remain turned-on even after the user falls asleep. If the turn-off time is set too short, then the user may still be awake when the audio electronic device is automatically turned-off.

Therefore, an improvement for an automatic turn-off audio electronic device is needed in the industry to address the aforementioned deficiency.

SUMMARY

An audio electronic device includes a player, an output device, a detector, and an automatic turn-off module. The player is for reproducing audio data. The output device is for transforming the audio data to audible sound. The detector is for detecting a positional shift of the output device. The automatic turn-off module is for turning off the player based on the positional shift. An automatic turn-off method is also disclosed.

Other advantages and novel features of the present invention will become more apparent from the following detailed description of preferred embodiment when taken in conjunction with the accompanying drawings, in which:

BRIEF DESCRIPTION OF THE DRAWINGS

FIG. 4 is a schematic diagram showing a value-setting menu corresponding to the automatic turn-off icon of FIG. 3.

DETAILED DESCRIPTION OF THE EMBODIMENTS

Reference will now be made to the drawings to describe a preferred embodiment of the present audio electronic device and a preferred embodiment of the present automatic turn-off method for automatically turning off the audio electronic device.

Figure 1:
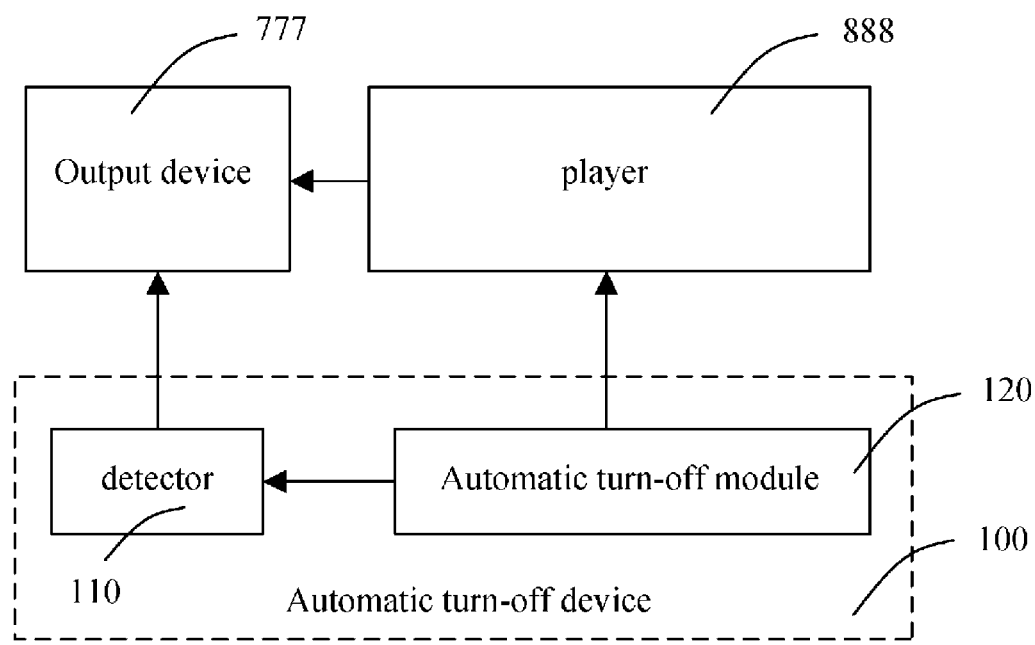
FIG. 1 is a schematic diagram showing an audio electronic device in accordance with a first exemplary embodiment.

Referring to FIG. 1, an audio electronic device 999 in accordance with a first exemplary embodiment includes an output device 777, a player 888, and an automatic turn-off device 100. The output device 777 may be a pair of headset, for example. The player 888 reproduces audio data, and the output device 777 transforms the audio signals to audible sound. The automatic turn-off device 100 includes a detector 110 for detecting positional shifts of the output device 777, and an automatic turn-off module 120 for turning off the player 888 based on the positional shifts. In the embodiment, the detector 110 and the automatic turn-off module 120 are combined as an integrated piece. In another embodiment, the detector 110 can be incorporated in the output device 777, and the automatic turn-off module 120 can be incorporated in the player 888.

When the position of the output device 777 changes, the detector 110 generates a motion detected signal. In the embodiment, a tri-axis accelerator is used as the detector 110. When the position of the output device 100 changes, the tri-axis accelerator detects X-axis acceleration, Y-axis acceleration, and Z-axis acceleration, and then calculates the positional shift according to the X-axis acceleration, Y-axis acceleration, and Z-axis acceleration.

Figure 2:
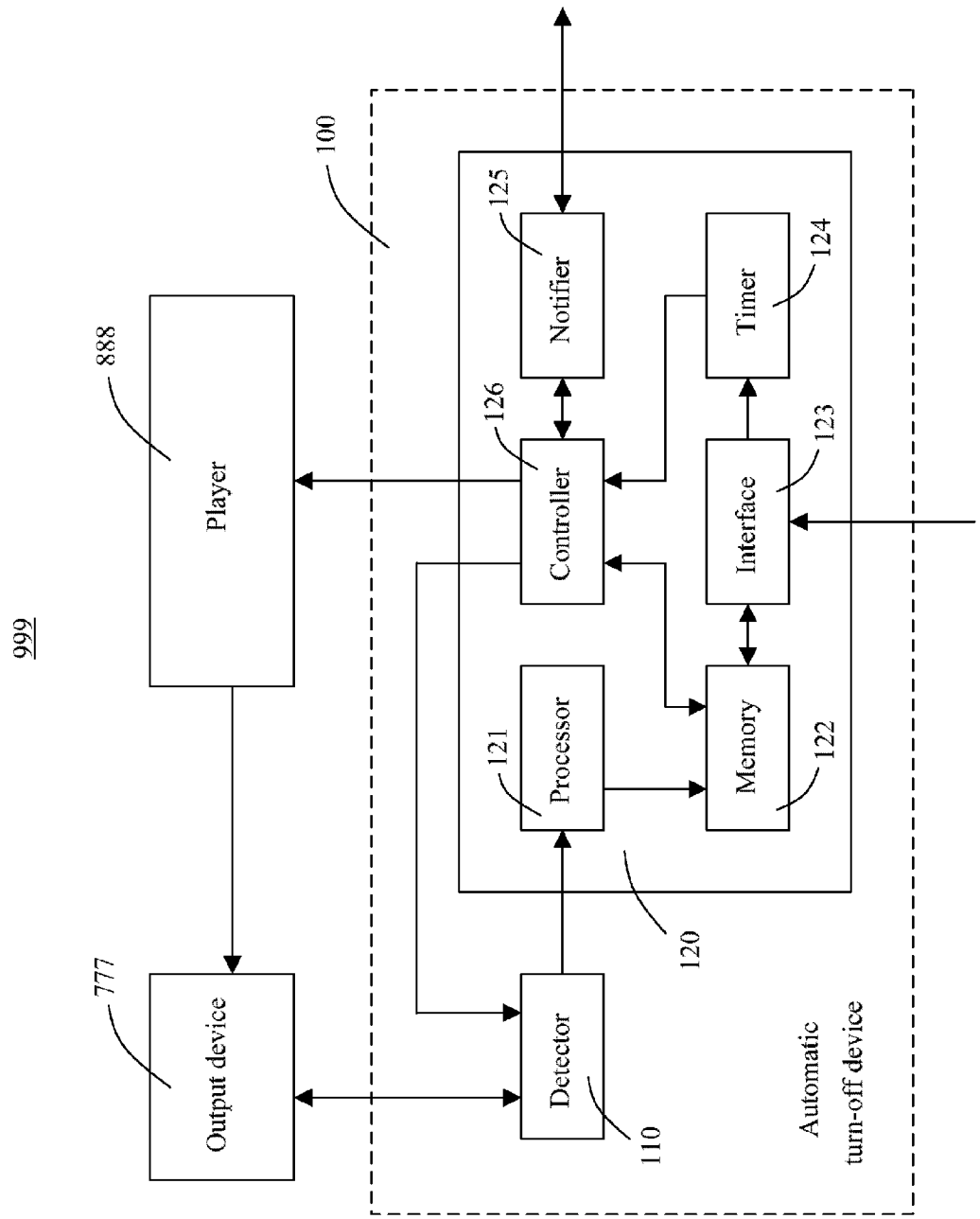
FIG. 2 is a schematic diagram showing an automatic turn-off module of FIG. 1.

Referring to FIG. 2, the automatic turn-off module 120 includes a processor 121, a memory 122, an interface 123, a timer 124, a notifier 125, and a controller 126.

The processor 121 is for receiving the detected signal and generating displacement detected data from the detected signal. The memory 122 is for storing the displacement detected data. Furthermore, the memory 122 also stores some predetermined values. The interface 123 is for allowing users to set and modify the predetermined values. The notifier 125 is for notifying users by producing a predetermined sound or by vibrating, and prompting for a user input. The controller 126 is for controlling the detector 110, the memory 122, the notifier 125, and the player 888. The timer 124 is for measuring the time, and signaling the controller 126.

There are four predetermined values set through the interface 123 and stored in the memory 123. The predetermined values include a start time, a motion monitoring time length, a wait time, and a displacement value. The predetermined values are explained as follows: When a system time of the audio electronic device 999 reaches the start time, the audio electronic device 999 is in a motion monitoring state, the controller 126 enables the detector 110 to detect a predetermined amount of motions in a motion monitoring time. In the motion monitoring state, current displacement detected data, calculated by the controller 126, is compared with the displacement value to compute whether the audio electronic device 999 is to be turned-off. If the audio electronic device 999 needs to be turned-off in one judging operation, the notifier 125 prompts for a user input within the wait time.

Figure 3:
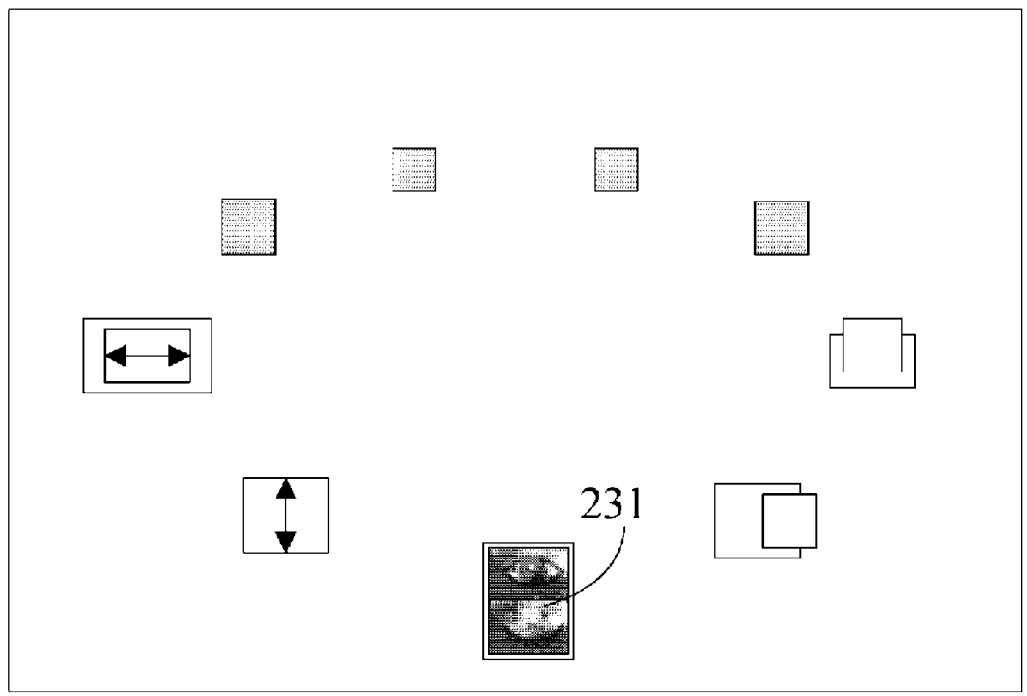
FIG. 3 is a schematic diagram showing an interface of FIG. 2, the interface having an automatic turn-off icon.
Figure 5:
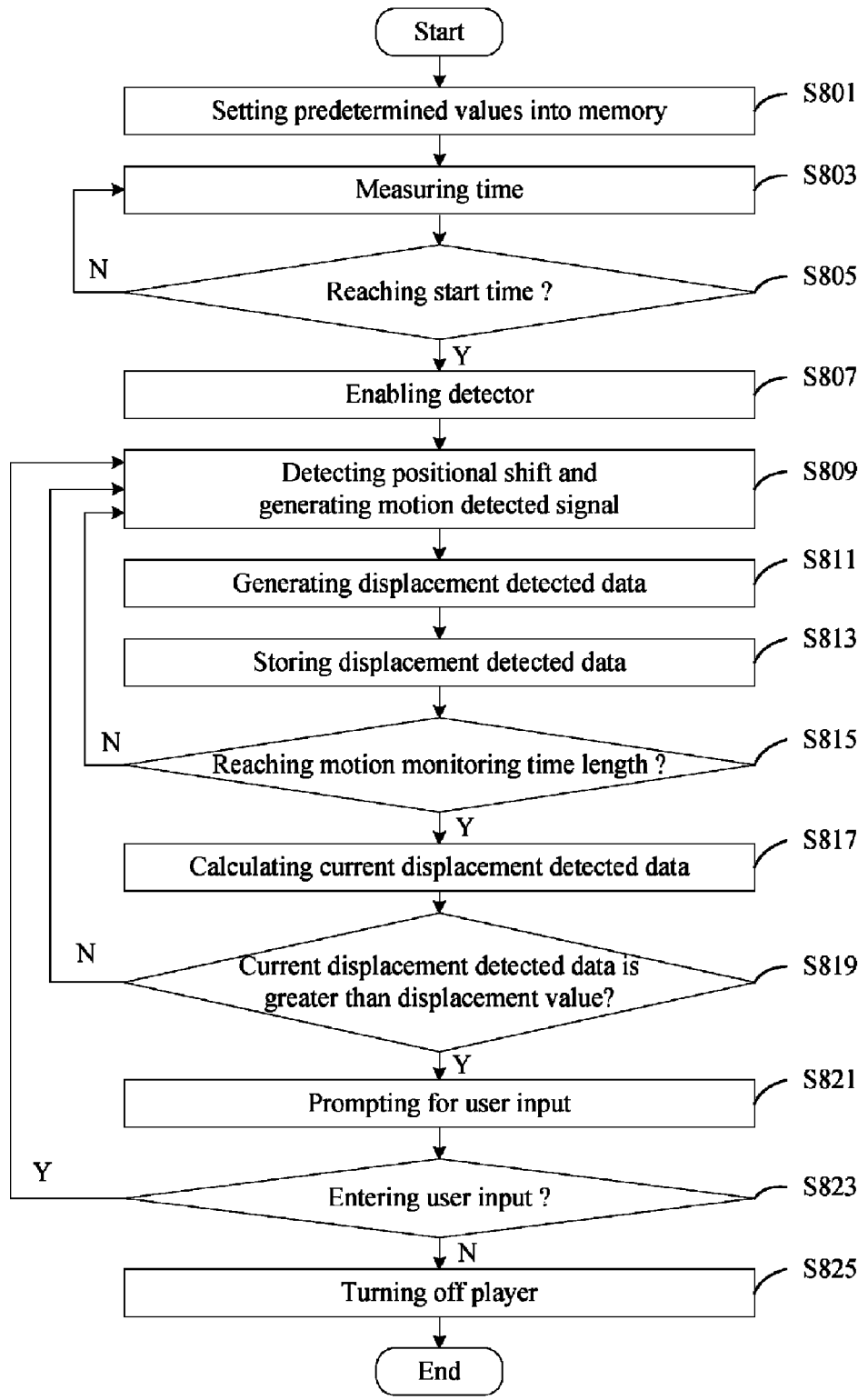
FIG. 5 is a process flow diagram illustrating an automatic turn-off method in accordance with an exemplary embodiment.

Referring to FIGS. 3 and 4, the interface 123 has many icons such as an automatic turn-off icon 231. When the automatic turn-off icon 231 is clicked, a value-setting menu 232 is opened.

In the value-setting menu 232, an automatic turn-off function can be selected to invoke the automatic turn-off function. In addition to the start time, the motion monitoring time length, the wait time, and the displacement value can be set or modified in the value-setting menu 232. In the embodiment, the start time is set at 30 minutes; the motion monitoring time length is set at 5 minutes; the wait time is set at 60 seconds; the displacement value is set at 3 centimeters. There are also two buttons, e.g. an OK button and a Back button. If the OK button is clicked, the timer 124 is enabled to measure the time.

Once the automatic turn-off function of the automatic turn-off device 100 is invoked, if the predetermined values have been set into the memory 122, the timer 124 is enabled to measure the time. If the predetermined values have not been set into the memory 122, the predetermined values need to be set into the memory 122 first via the interface 123, otherwise the automatic turn-off device 100 is unable to perform the automatic turn-off function.

When the time reaches the start time, the controller 126 enables the detector 110. Whenever the position of the output device 777 changes, the detector 110 would detect a corresponding motion of the output device 777 and generate a motion detected signal. The processing module 240 receives the motion detected signal and generates the displacement detected data.

For example, if, in one predetermined time length, it is assumed that the position of the output device 777 changes three times, the detector 110 detects three corresponding motions and generates three motion detected signals. The processor 121 generates three displacement detected data. The memory 122 stores the three displacement detected data. The controller 126 calculates a current displacement detected data from the stored displacement detected data according to a predetermined principle.

The controller 126 compares the current displacement detected data with the displacement value to get a comparison result whether the audio electronic device 999 is to be turned-off. In a first condition, if the current displacement detected data is greater than the displacement value, the audio electronic device 999 should keep turned-on. In a second condition, if the current displacement detected data is not greater than the displacement value, the audio electronic device 999 should be turned-off.

In the second condition, the notifier 125 prompts for a user input within the wait time. If no user input is received within the wait time, the controller 126 turns off the player 888. If a response is entered, the automatic turn-off device 100 begins a new motion monitoring state.

Referring to FIG. 4, an automatic turn-off method in accordance with an exemplary embodiment is for automatically turning off the audio electronic device 999. A procedure of the automatic turn-off method includes the following steps.

The predetermined values including the start time, the motion monitoring time length, the wait time, and the displacement value are set into the memory 122 via the interface 123 (step S801).

The timer 124 measures the time (step S803).

The controller 126 judges whether the time reaches the start time (step S805). If the time reaches the start time, the procedure goes to step S807. If the time reaches the start time, the procedure goes to step S803.

The controller 126 enables the detector 110 (step S807).

The detector 110 detects the positional shift and generates the motion detected signal (step S809).

The processor 121 generates the displacement detected data from the detected signal (step S811).

The memory 122 stores the displacement detected data (step S813).

The controller 126 judges whether one motion monitoring time length has passed (step S815). If the motion monitoring time length has passed, the procedure goes to step S817. If the motion monitoring time length has not passed, the procedure goes to step S809.

The controller 126 calculates the current displacement detected data (step S817).

The controller 126 compares the current displacement detected data with the displacement value (step S819). If the current displacement detected data is greater than the displacement value, the procedure goes to step S809. If the current displacement detected data is not greater than the displacement value, the procedure goes to step S821.

The notifier 125 prompts a user input within the wait time (step S821). That is, the notifier 125 requires a response from the users in the wait time.

The controller 126 judges whether the user input is entered (step S823). If no response is entered, the procedure goes to step S825. If the user input is provided, the procedure goes to step S809.

The controller 126 turns off the player 888 (step S825).

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. An audio electronic device comprising:
a player for reproducing audio data;
an output device for transforming the audio data to audible sound;
a detector for detecting a positional shift of the output device; and
an automatic turn-off module for turning off the player based on the positional shift.

2. The audio electronic device according to claim 1, wherein the detector is for generating a detected signal corresponding to the positional shift, and the automatic turn-off module comprises a processor for generating displacement detected data from the detected signal.

3. The audio electronic device according to claim 2, wherein the automatic turn-off module comprises a memory for storing start time, a motion monitoring time length, wait time, a displacement value, and the displacement detected data.

4. The audio electronic device according to claim 3, wherein the automatic turn-off module comprises an interface for allowing the start time, the motion monitoring time length, the wait time, the displacement value to be set and modified.

5. The audio electronic device according to claim 3, wherein the automatic turn-off module comprises a controller for calculating a current displacement detected data from the stored displacement detected data, and comparing the current displacement detected with the displacement value, and further turning off the player if the current displacement detected is compared to be not greater than the displacement value.

6. The audio electronic device according to claim 4, wherein the automatic turn-off module comprises a notifier for generating notice information.

7. The audio electronic device according to claim 1, wherein the automatic turn-off module comprises a timer for measuring the time.

8. The audio electronic device according to claim 1, wherein the detector is a tri-axis accelerator.

* * * * *